Oct. 31, 1961 F. A. KROHM ET AL 3,006,017
WINDSHIELD WIPER BLADE
Filed Dec. 30, 1957 2 Sheets-Sheet 1
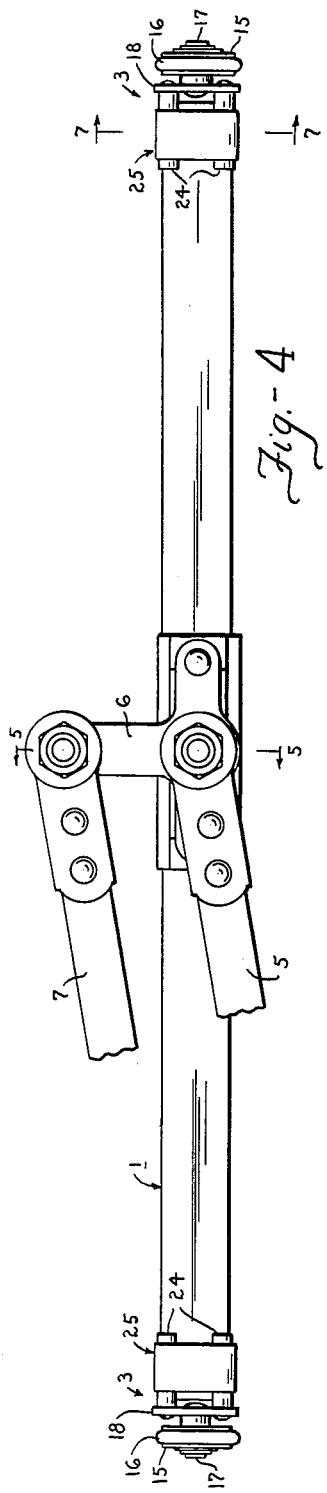
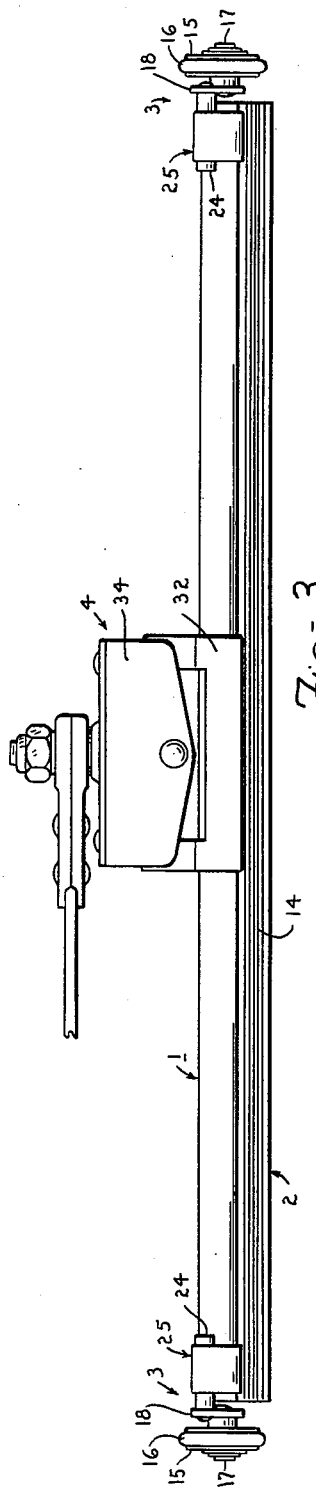
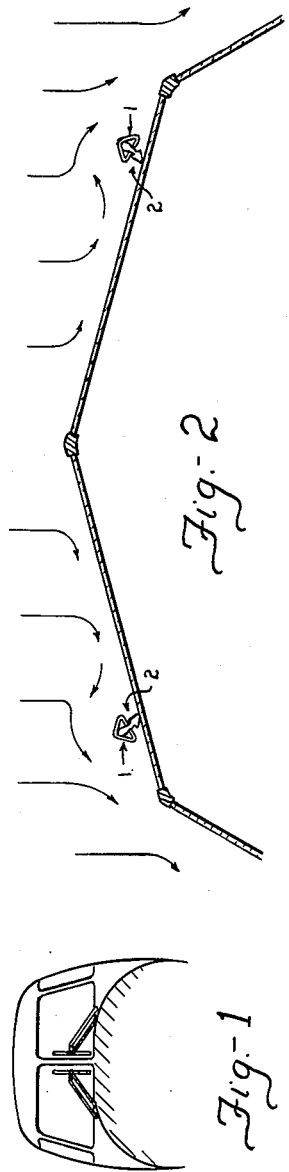
INVENTOR.
FRED A. KROHM &
STANLEY L. OKLEJA
BY Charles S. Penfold
ATTORNEY

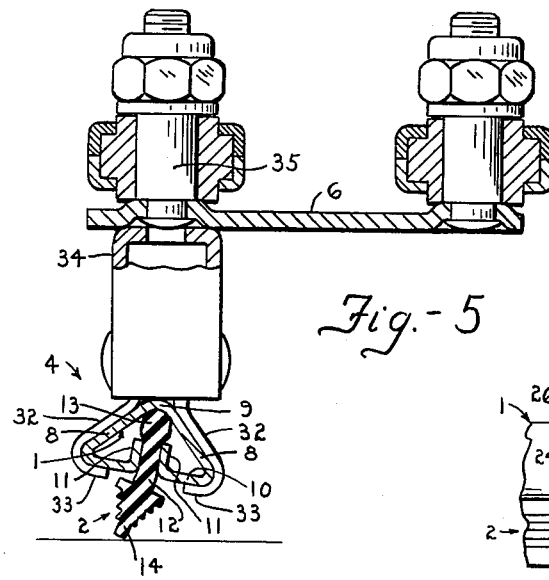
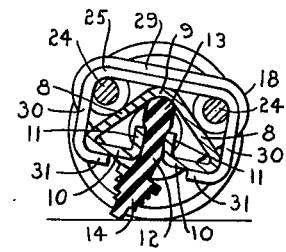
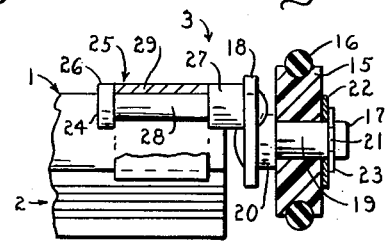
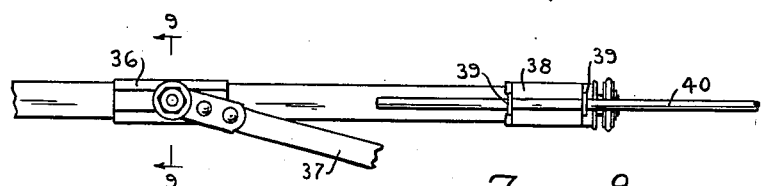
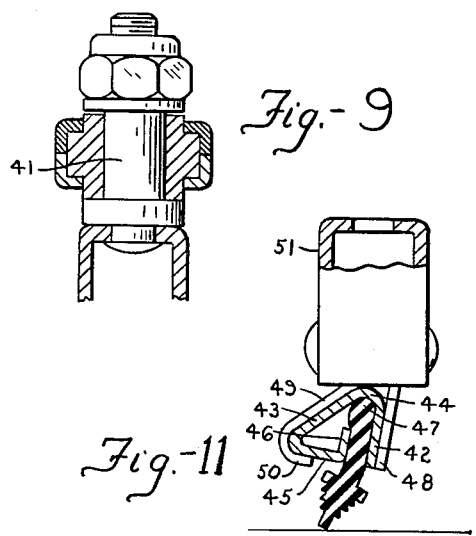
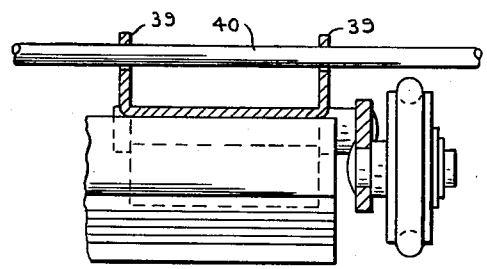

United States Patent Office 3,006,017
Patented Oct. 31, 1961

3,006,017
WINDSHIELD WIPER BLADE
Fred A. Krohm, Hobart, and Stanley L. Okleja, Gary, Ind., assignors to The Anderson Company, a corporation of Indiana
Filed Dec. 30, 1957, Ser. No. 705,870
8 Claims. (Cl. 15—250.37)

This invention relates generally to windshield wiper blades and more particularly is directed to a blade which is primarily adapted for wiping the windshield of an airplane.

In military and commercial aircraft where travel at high speeds is constantly changing, air pressures and turbulence against and about the windshield interfere with the operation of the blade and lift or tend to pull it away from the windshield. This factor of windlift has confronted engineers for many years, and the problems relative thereto have continuously become more involved as the speeds of aircraft have advanced.

Various attempts have been made to remedy or counteract the incorrect operation and/or lifting of such blades, but none have proven completely satisfactory under all conditions of use. For example, one form of conventional blade assembly in commercial use for aircraft includes a channel-shaped backing, a resilient wiper element secured in the backing, a flared facing or fairing strip and a member or brace for connecting the strip to the backing. This particular form of blade assembly is not only expensive to manufacture and assemble, due in part to the multiplicity of components comprising the assembly, but the fairing strip is of such a size that it is considerably higher than the height of the blade consisting of the backing and wiper element and consequently extends beyond the confines of the blade and outwardly from the windshield a distance where wind pressures interfere with the intended operation of the blade assembly. Moreover, such a blade assembly is quite heavy, and this may prove detrimental in those instances where the power unit is not adequate to correctly oscillate the blade assembly.

With the foregoing in mind, one of the principal objects of the invention is to provide a blade comprising a backing or support and a resilient wiper element in which the support embodies improved principles of design and construction and whereby additional components, such as the fairing strip and brace member in the form of the conventional blade assembly above described, are eliminated. In other words, the structure of the subject invention requires only a minimum number of components or elements for achieving efficient results in operation as compared to such conventional blade assembly having a multiplicity of parts or portions.

A significant object of the invention is to provide a blade in which the support is substantially triangular in cross section and of a size to reduce the over-all height of the blade so that the blade will have a low silhouette and not be unduly subjected to the influence of variable wind pressures and turbulence to the extent of conventional blades.

An important object of the invention is to provide a blade in which the wiper element is secured in the support in a unique manner.

Another object of the invention is to provide a blade in which the cross-sectional characteristics of the support are such that blades of greater lengths can be utilized as compared to conventional blades which are comprised of a channel-shaped backing having inturned curved side walls which grip a wiper element.

A further object of the invention is to provide a blade with rollers at its extremities for controlling the extent of the wiping pressure between the wiper element and the windshield, including improved means for attaching the rollers to the blade.

A specific object of the invention is to provide a blade in which various improved connection means are employed to operatively connect the blade with different forms of driving arms.

Additional attributes of the invention reside in providing a blade which offers advantages with respect to costs of manufacture and assembly, installation, efficiency and durability.

Other objects and advantages of the invention will become apparent after the description hereinafter set forth is considered in conjunction with the drawings annexed hereto.

In the drawings:
FIGURE 1 is a partial front elevational view of the body of an airplane showing blades embodying the invention applied to the windshield sections of the airplane;
FIGURE 2 is a transverse sectional diagrammatic view exemplifying what may be the general course of air currents relative to the windshield sections and blades thereon;
FIGURE 3 is a side elevational view of the blade assembly embodying the invention;
FIGURE 4 is a top view of the blade assembly shown in FIGURE 3 with a parallel motion linkage assembly operatively connected to the blade;
FIGURE 5 is an enlarged transverse sectional view taken substantially on line 5—5 of FIGURE 4;
FIGURE 6 is a side elevational view of a part of the blade with portions of one of the rollers and attaching means therefor shown in section;
FIGURE 7 is a transverse section taken substantially on line 7—7 of FIGURE 4;
FIGURE 8 is a top plan view of the blade embodying the invention having a movement-modifying arm operatively connected to an inner extremity of the blade;
FIGURE 9 is an enlarged transverse section taken substantially on line 9—9 of FIGURE 8;
FIGURE 10 is an enlarged view of a part of the blade shown in FIGURE 8 illustrating the character of the connection between the blade and modifying arm; and
FIGURE 11 is a modified form of blade.

Referring first to the structure illustrated in FIGURES 1 through 7 of the drawing, the blade includes a support generally designated 1 and a resilient wiper element generally designated 2, roller means 3 carried by the extremities of the blade, and connector means generally designated 4 mounted substantially centrally on the blade for attachment with a parallel motion linkage assembly having a driving arm 5 pivotally connected to the connector by a lever 6, which lever is also pivotally connected to a movement-modifying arm 7 for pivoting the blade relative to the driving arm as the blade is oscillated across the windshield by the driving arm, all of which will be described more fully hereinafter.

The support generally designated 1 of the blade is unique in design and construction and, as alluded to above, is preferably generally triangular in cross section. More particularly in this regard, the support includes a pair of corresponding converging or inclined side walls 8 which are joined by a crest portion 9. The side walls are preferably disposed to form an included ninety-degree angle and are provided with inturned continuations 10 disposed substantially in the same plane and forming the bottom walls of the support. The inturned continuations or bottom walls 10 are in turn provided with upturned flanges or walls 11 which are arranged in a predetermined spaced parallel relationship within the confines of the support and a predetermined distance from the crest portion 9. The support may be constructed from any material suitable for the purpose, but is preferably made from stainless steel of a relatively heavy gauge.

The cross-sectional characteristics of the support and the thickness of the material of which it is constructed serve to impart considerable rigidity to the support so that relatively long supports of low silhouettes may be utilized as distinguished from a conventional blade having a high channel backing with inturned curved side walls and/or a reinforcement carried by the backing to prevent distortion thereof.

The wiper element is preferably formed to include an attaching portion 12 having a bead portion 13 along its inner marginal edge and a substantially triangular wiping portion or head 14 adapted for pivotal movement relative to the attaching portion and the support as disclosed in FIGURES 2, 5 and 7. The attaching portion, except for the bead portion, is of a substantially uniform thickness and of a width to be forcibly engaged or clamped between the upturned parallel walls 11 of the support so that a portion thereof adjacent the wiping head extends exteriorly of the support and constitutes a hinge which allows the head to pivot or swing back and forth when the blade is oscillated on the windshield. The size of the bead portion 13 and the spacing between the inner marginal edges of the upturned walls 11 and the crest portion 9 are preferably such that the bead is caught or held between these edges and the inner concave surface of the crest to lock the wiper element in place in addition to the holding action obtained by forcible engagement or compression of the attaching portion of the element by said walls. The inturned bottom walls 10 of the support under certain operating conditions may be alternatively engaged by the wiping head for controlling or limiting the pivotal movement of the head.

As clearly depicted in the drawings, the extremities of the blade are preferably provided with the roller means 3. These means are preferably utilized in those instances where considerable wiper arm pressures are employed to urge a blade against a windshield. In fact, some of the pressures applied to a blade through a spring-pressed wiper arm are such that the wiping element is pressed against a windshield to such an extent that it will not allow the wiping head to pivot or oscillate as intended. The roller means serve to alleviate this condition so that the pressure is primarily applied to the windshield through the rollers in a manner whereby the wiping head may engage the windshield to cause oscillation or tilting thereof as the blade is rolled back and forth across the windshield. In other words, the rollers serve to predetermine the position of the wiping portion so that the friction between the wiping portion and the windshield is just sufficient to allow the wiping head to oscillate and produce an effective wiping job. With this setup, the blade will function correctly and the operative life of the wiping element will be increased.

The roller means are unique in design and construction and, as illustrated, each preferably includes a roller 15 provided with a peripheral groove within which is secured a tire 16. The roller may be constructed of any material suitable for the purpose, such as nylon, and the tire of neoprene. If desired the tire may be eliminated in which event, the roller may be provided with a convex surface for engaging the windshield. Each of the rollers is mounted on an axle 17 secured to the central part of a generally triangular plate 18. The axle includes a reduced inner end portion which extends through a hole provided therefor in the plate and is upset to permanently secure the axle in place. Each axle also includes a cylindrical portion 19 on which the roller or wheel is journaled and an enlarged cylindrical portion 20 which engages the outer surface of the plate and an inner surface of the roller for spacing the roller a predetermined distance from the plate. The outer extremity of each axle is provided with an angular groove 21. A relatively large washer or abutment 22 is mounted on the cylindrical portion 19 of the axle in abutting relation to the outer surface of the roller, and a locking element 23, preferably in the form of a resilient split member, is received in the groove 21 for engaging the outer surface of the washer. The axial distance between the washer 22 and the enlarged cylindrical portion 20 of the axle is predetermined so that the roller will freely rotate on the axle.

Each of the triangular plates 18 is preferably secured to an end of the blade by a pair of corresponding spindles 24 which extend into a substantially rectangular fitting generally designated 25. More specifically in this regard, each of the spindles has an outer reduced end which extends through a hole provided therefor in the plate and is upset to permanently secure each spindle to the plate, preferably adjacent the upper corners of the plate. Each spindle also includes a pair of axially spaced cylindrical portions 26 and 27 which are joined by an intermediate reduced cylindrical portion 28.

Each of the fittings designated 25 may be designed and constructed as desired, but, as disclosed, each preferably includes an upper planar wall 29, a pair of corresponding depending parallel side walls 30, the latter of which are provided with inturned continuations 31. More particularly in this respect, the arrangement is preferably such that when each of the roller means is correctly mounted on the blade, the cylindrical portions 26 and 27 of the spindles 24 will engage the sloping side walls 8 of the support, as depicted in FIGURES 6 and 7 and so that the reduced cylindrical portions 28 of the spindles will be engaged by those portions of the fitting which join the upper and side walls thereof. In other words, the reduced cylindrical portions of the spindles engage the inner concave surfaces at the upper corners of the fitting and, since the portions of the fitting are caught between the axially spaced cylindrical portions of the spindles, the spindles are trapped or firmly held in place against displacement. It should be noted that the inturned continuations 31 on the side walls of each fitting engage the undersurfaces of the bottom walls 10 of the support. When the parts are assembled as just described, the fittings are preferably brazed to the bottom walls of the support in order to permanently secure the roller means to the extremities of the blade.

The connector means generally designated 4, above referred to, may be designed and constructed as desired, but, as exemplified particularly in FIGURE 5 of the drawings, preferably includes a saddle member which is made in the form of a channel having a pair of sloping or inclined side walls 32 which engage the outer surfaces of the sloping side walls 8 of the support and inturned continuations 33 which engage the undersurfaces of the bottom walls 10 of the support. The saddle member is preferably permanently fixed to the support by brazing and preferably rockably connected to a fitting 34 in a desirable manner so that the blade and member as a unit may tilt or pivot with respect to the fitting. The fitting is also preferably channel-like in character and is provided with a fixed upstanding stud 35 to which the lever 6, above referred to, is fixed against movement thereon. The stud is pivotally secured to the wiper driving arm 5 and the lever to the movement-modifying arm 7 in a manner whereby, when the blade is oscillated on the windshield by the driving arm, the movement-modifying arm will cause the blade to pivot with respect to the driving arm.

In the modified structure illustrated in FIGURES 8, 9 and 10 of the drawing, there is disclosed a wiper blade provided with a connector 36 intermediate its length and a wiper driving arm 37 pivotally connected to the connector. The blade is preferably provided with roller means which substantially correspond to those above described and is further provided with a guide which is attached to the inner extremity of the blade. The guide may be designed and constructed as desired, but, as shown, is preferably provided with a base portion 38 which is preferably brazed to the support of the blade and with upturned parallel end walls 39 having aligned apertures therein for slidably receiving a movement-modifying arm 40 in a manner whereby when the blade is oscillated on a windshield by the driving arm 37, the movement-modifying arm will slide in the guide and cause the blade to pivot with respect to the driving arm. The driving arm may be attached to the connector means on the blade in any manner desired, but, as illustrated, the connector means preferably includes a fixed stud 41 and a sleeve which is journaled on the stud and means for securing the sleeve to the driving arm. A lock nut may be attached to the stud for holding the driving arm connected with the blade.

The structure of a modified form of blade is illustrated in FIGURE 11 of the drawing and may be utilized as desired. In this modified form of blade, the support is also made substantially triangular in cross section. More specifically in this respect, the support includes what may be termed a vertical side wall 42, an inclined or sloping wall 43 which is joined to the side wall by a crest portion 44. The sloping wall is preferably provided with an inturned continuation 45 forming a bottom wall of the support, and the bottom wall is provided with an upturned wall or flange 46 which is disposed in a predetermined spaced parallel relationship to the vertical side wall. The vertical side wall and upturned wall serve to clamp an attaching portion of a wiper element therebetween. The wiper element is provided with a marginal bead portion 47, and it will be noted that the size of this portion as well as the distance between the inner marginal edge of the upturned wall and the inner surface of the crest portion 44 is predetermined so that the bead will be held or caught between the crest portion and said edge to firmly secure the wiper element to the support. The wiper element also includes a wiping portion or head. It will be noted that the length of the attaching portion is such that a portion thereof extends below the confines of the support or below the bottom wall of the support in order to provide a hinge portion to allow the wiping head to correctly oscillate with respect to the support. A connector means is utilized for connecting the blade to a wiper arm and preferably includes a channel member having a vertical side wall 48 for engaging the vertical side wall and the support, an inclined wall 49 for engaging the sloping wall 43 of the support and an inturned portion 50 engaging the bottom wall of the support. This channel member is preferably anchored to the support by brazing and is pivotally connected to a fitting 51 which in turn is attached to the wiper arm 37.

Having thus described our invention, it is obvious that various other modifications may be made in the same without departing from the spirit of our invention; hence, we do not wish to be understood as limiting ourselves to the exact forms, constructions, arrangements and combinations of parts herein shown and described.

We claim:

1. A windshield wiper blade comprising an elongate support and a resilient wiping element, said support having a pair of corresponding side walls converging toward one another and defining an internal surface extending medially of the support, said side walls being provided with continuations forming planar bottom walls disposed in acute angular relationship to the side walls and also forming upturned parallel walls having longitudinal edges spaced from said surface, said wiping element having a wiping portion, an intermediate portion clamped between the upturned walls and a preformed bead portion disposed in the space between the surface and the longitudinal edges, and a connector for attaching the blade to a wiper arm, said connector comprising a pair of sloping walls engaging said converging side walls and a pair of inturned portions constituting continuations of said sloping walls engaging said bottom walls for locking the connector to said support.

2. An elongate rigid member for a resilient windshield wiper element, said member being formed to include a pair of connected converging side walls, a pair of substantially coplanar bottom walls joined to the side walls to define a support which is substantially triangular in cross section, and a pair of upturned walls joined to the bottom walls and extending upwardly between the side walls for supporting a resilient wiper element, and a connector carried by said member for attaching the latter to a wiper arm, said connector comprising a pair of sloping walls engaging said converging side walls and a pair of inturned portions engaging said bottom walls for locking the connector to said member.

3. An elongate rigid support for a resilient windshield wiper element, said support being formed to include: a vertical side wall and an inclined side wall joined to the vertical side wall, a substantially planar bottom wall joined to the inclined side wall at an oblique angle thereto and an upturned wall joined to the bottom wall extending between the side walls in substantially parallel relation to the vertical side wall for supporting a resilient wiper element between said vertical wall and upturned wall, and a connector carried by said support for attaching the latter to a wiper arm, said connector having a sloping wall and a vertical wall respectively engaging said inclined wall and said side wall and also having an inturned wall engaging said bottom wall for locking said connector to said support.

4. An elongated resilient windshield wiper element and an elongate support therefor, said support including an upper structure and a pair of inturned substantially coplanar bottom walls provided with abutments disposed within the confines of the support, said wiper element including an attaching portion clamped between the abutments, a preformed bead disposed above the abutments, a wiping portion movable with respect to the attaching portion, and a connector carried by said support for attaching the latter to a wiper arm, said connector comprising a structure receiving said upper structure and a pair of inturned portions engaging said bottom walls for locking said connector to said support.

5. A windshield wiper blade assembly comprising an elongate support and a resilient wiper element, said support having a pair of converging side walls provided with continuations forming bottom walls and upturned walls, said wiper element having an attaching portion secured between the upturned walls and a wiping portion movable with respect to the attaching portion, a member having a pair of means respectively overlying the side walls, means bearing against the bottom walls and overlying the support and said pair of means for securing the latter in place and locating the member transverse to the longitudinal axis of the support in axially spaced relationship to one end of the support, pivot means carried by the member and extending generally in alignment with the support, and a roller mounted on the pivot for maintaining the support in a predetermined spaced relationship to a surface to be wiped.

6. A windshield wiper blade comprising an elongate support and a resilient wiping element, said support having a pair of corresponding side walls converging toward one another and defining an internal surface extending medially of the support, said side walls being provided with continuations forming bottom walls disposed in acute angular relationship to the side walls and also forming upturned walls having longitudinal edges spaced from said surface, said wiping element having an intermediate portion clamped between the upturned walls, a preformed bead portion disposed in the space between the surface and the longitudinal edges and a wiping portion carried by the intermediate portion for movement with respect thereto, a pair of separate elongate elements fixedly supported on the side walls and having extremities extending beyond one end of the support, a mounting member carried by the elements, a shaft secured to the member in substantial alignment with the support, and a roller mounted on the shaft.

7. A windshield wiper comprising an elongate resilient element having a wiping portion and a bead portion joined to the wiping portion by an intermediate restricted portion, an elongate support comprising a crest portion bearing on the bead portion of the element and a pair of corresponding planar side walls extending downwardly and outwardly from the sides of the element, said support also comprising a pair of inturned coplanar bottom walls joined to the side walls and a pair of parallel walls joined to the bottom walls and extending upwardly and clamping against the restricted portion of the element, said bottom walls being disposed in acute angular relationship to the side walls and extending substantially perpendicular with respect to the sides of the element, and a connector carried by said support for attaching the wiper to a wiper arm, said connector comprising a pair of sloping walls engaging said side walls and a pair of inturned portions engaging said bottom walls for locking said connector to said support.

8. A windshield wiper blade comprising an elongate support having converging side walls and a resilient wiper element secured to said support and provided with a wiping edge, a plate provided with a pair of parallel spindles overlying and engaging said side walls, a member having a pair of inclined walls respectively overlying and engaging said spindles and also having offset continuations extending from said inclined walls which are connected to said support to secure said plate in a position transverse to the longitudinal axis of the support in axially spaced relationship to one end of the support, said plate also being provided with a shaft extending generally axially outward from the blade in a plane parallel to said wiping edge, and a roller carried by said shaft.

References Cited in the file of this patent

UNITED STATES PATENTS

| | | |
|---|---|---|
| 1,978,192 | Freud | Oct. 23, 1934 |
| 2,094,206 | Dudley | Sept. 28, 1937 |
| 2,128,454 | Cullin | Aug. 20, 1938 |
| 2,814,820 | Elliott | Dec. 3, 1957 |
| 2,814,821 | Wallis | Dec. 3, 1957 |
| 2,824,331 | Wallis | Feb. 25, 1958 |

FOREIGN PATENTS

| | | |
|---|---|---|
| 468,866 | Great Britain | July 14, 1937 |